US011595211B2

(12) United States Patent
Drouot (10) Patent No.: US 11,595,211 B2
(45) Date of Patent: Feb. 28, 2023

(54) APPARATUS AND METHODS FOR INTELLIGENT TOKEN-BASED AUTHENTICATION WITHIN A DISTRIBUTED DATABASE USING HIERARCHICAL DATA FILES

(71) Applicant: EYGS LLP, London (GB)

(72) Inventor: Quentin Drouot, Antony (FR)

( * ) Notice: Subject to any disclaimer, the term of this patent is extended or adjusted under 35 U.S.C. 154(b) by 336 days.

(21) Appl. No.: 16/848,970

(22) Filed: Apr. 15, 2020

(65) Prior Publication Data

US 2020/0328891 A1 Oct. 15, 2020

Related U.S. Application Data

(60) Provisional application No. 62/834,224, filed on Apr. 15, 2019.

(51) Int. Cl.
| | |
|---|---|
| *H04L 9/32* | (2006.01) |
| *G06F 16/27* | (2019.01) |
| *H04L 9/06* | (2006.01) |
| *G06F 16/23* | (2019.01) |
| *G06F 16/185* | (2019.01) |
| *H04L 9/00* | (2022.01) |

(52) U.S. Cl.
CPC .......... *H04L 9/3213* (2013.01); *G06F 16/185* (2019.01); *G06F 16/2379* (2019.01); *G06F 16/27* (2019.01); *H04L 9/0637* (2013.01); *H04L 9/50* (2022.05)

(58) Field of Classification Search
CPC ....... H04L 9/3213; H04L 9/0637; H04L 9/50; G06F 16/27; G06F 16/2379; G06F 16/185
See application file for complete search history.

(56) References Cited

U.S. PATENT DOCUMENTS

| | | | |
|---|---|---|---|
| 10,135,607 B1 * | 11/2018 | Roets | ............. G06F 21/64 |
| 10,666,426 B2 * | 5/2020 | Roets | ............. G06F 21/10 |
| 2018/0167198 A1 * | 6/2018 | Muller | ............. H04L 9/0825 |

(Continued)

OTHER PUBLICATIONS

Martin WesterKamp et al: "Block chain-based Supply Chain Traceability: Token Recipes model Manufacturing Processes"; 2018; pp. 1595-1602. (Year: 2018).*

(Continued)

*Primary Examiner* — Yonas A Bayou
(74) *Attorney, Agent, or Firm* — Cooley LLP (57) ABSTRACT

Methods of using intelligent, blockchain-compatible asset tokens for non-fungible assets are described. The intelligent asset tokens can be customized to include a three-layer hierarchical identifier representing a hierarchy of asset data. The three-layer hierarchical identifier can include a reference layer representing the non-fungible asset type, a product layer representing the specific asset unit, and a rights and/or obligations layer representing rights and/or obligations associated with the specific asset unit of the product layer. Transactions of the non-fungible assets can be authenticated using the intelligent asset tokens, and can be performed using a smart contract at each layer of the hierarchy. A reference token can also be generated, specifying an address of a smart contract associated with an owner of a non-fungible asset. The smart contract can be used to enforce rules for the use of the intelligent asset tokens on the blockchain.

20 Claims, 5 Drawing Sheets

(56) References Cited

U.S. PATENT DOCUMENTS

| | | | | |
|---|---|---|---|---|
| 2018/0191503 A1* | 7/2018 | Alwar | ................... | H04L 9/14 |
| 2019/0130483 A1* | 5/2019 | de Jong | ............... | G06Q 40/04 |
| 2019/0347725 A1* | 11/2019 | de Jong | ............. | G06Q 20/065 |
| 2020/0059362 A1* | 2/2020 | Brody | ................ | H04L 9/3242 |
| 2020/0193516 A9* | 6/2020 | de Jong | ............... | H04L 9/50 |
| 2020/0274712 A1* | 8/2020 | Gray | ................ | H04L 9/3213 |

OTHER PUBLICATIONS

International Search Report and Written Opinion for International Application No. PCT/EP2020/060633, dated Jun. 25, 2020, 10 pages.

Westerkamp, M. et al., "Blockchain-based supply chain traceability: Token recipes model manufacturing processes," [Online], Retrieved from the Internet: <URL: https://arxiv.org/abs/1810.09843>, arXiv:1810.09843v1, Oct. 15, 2018, 8 pages.

\* cited by examiner

APPARATUS AND METHODS FOR INTELLIGENT TOKEN-BASED AUTHENTICATION WITHIN A DISTRIBUTED DATABASE USING HIERARCHICAL DATA FILES

CROSS-REFERENCE TO RELATED APPLICATIONS

This application claims priority to and benefit of U.S. Provisional Application No. 62/834,224, titled "Apparatus and Methods for Complex Asset Traceability and Transacting with a Distributed Database Using Hierarchical Data Files," filed Apr. 15, 2019, the entire disclosure of which is incorporated herein by reference in its entirety.

TECHNICAL FIELD

The present disclosure relates to the use of intelligent tokens for controlling processes such as authentication within a computerized system having a distributed database over a network.

BACKGROUND

A blockchain is a secure, modification-resistant chain of sequential, verifiable records (or "blocks") typically representing transactions between parties. A blockchain is typically stored in a distributed manner, for example as a distributed digital ledger, and communicatively coupled to a network.

SUMMARY

A processor-implemented method for the fully on-chain (i.e., entirely on the blockchain or any other distributed ledger) ownership transfer and tracking of complex tangible assets using a blockchain is described. In an embodiment, the method includes customizing asset tokens (or "product tokens") such that they include a hierarchical identifier, having at least three layers and representing a hierarchy of asset data. The three-layer hierarchical identifier can include a reference layer representing the non-fungible asset type, a product layer representing the specific asset unit, and a rights and/or obligations layer representing rights and/or obligations associated with the specific asset unit of the product layer. Transactions involving the asset tokens (also referred to herein as "intelligent asset tokens") can be authenticated, for example in response to a real-world transaction associated with the non-fungible asset. In addition, transactions involving the asset tokens be performed at each layer of the hierarchy, or at one layer or at a subset of the layers of the hierarchy. A reference token can also be generated, specifying an address of a smart contract that can be used to enforce rules for the use of the asset tokens (or product tokens) sharing this reference on the blockchain.

DETAILED DESCRIPTION

Known methods for storing large quantities of data using a blockchain typically include storing cryptographic hashes of the data on the blockchain, and storing large volumes of data in off-chain storage locations, with the cryptographic hashes serving as references to the off-chain data. Such methods are generally not, however, suitable for the tracking of hierarchical data (i.e., data having associated "child" data and/or "parent" data). Moreover, such methods do not typically facilitate the representation of tangible assets on the blockchain or the transfer of ownership of tangible assets via blockchain transactions. The shortcomings of the aforementioned methods are overcome by embodiments of the present disclosure, using blockchain-based methods and systems for generating, transferring and tracking "asset tokens" that represent "complex" tangible/physical assets. Assets represented by asset tokens of the present disclosure can be unique (e.g., a parcel of land or a machine such as an automobile, an aircraft, a computing device, etc.) or fungible (e.g., a liter of 99% ethanol).

In some embodiments, asset tokens (also referred to herein as blockchain asset tokens) are associated with non-fungible assets, and are customized to include a representation of three-layer hierarchical information (or "hierarchy"). The first layer of the three-layer hierarchical information is a reference layer representing the non-fungible asset "type." Example asset types include, by way of non-limiting example, manufactured goods such as automobiles, aircraft, computers, watches, food products, raw materials, etc. The reference layer is encoded within/as a first portion of a token identifier ("token ID") associated with the asset token. The second layer of the three-layer hierarchical information is a product layer representing the specific asset unit. A specific asset unit can be a serial number (e.g., AB123) or other number or string of characters that uniquely identifies an individual asset having the associated asset type. The product layer is encoded within/as a second portion of the token ID associated with the asset token. The third layer of the three-layer hierarchical information is a rights and/or obligations layer representing rights and/or obligations associated with the specific asset unit of the product layer, such as ownership and/or custody of that specific asset unit.

As discussed above, the token ID can include a representation of the reference layer, followed by a representation of the product layer, followed by a representation of the product rights layer. In other words, the token ID can include sequential representations of the reference layer, product layer, and product rights layer. For example, the token ID can include a representation of the reference layer (e.g., 120 bits), immediately followed by a representation of the product layer (e.g., 128 bits), immediately followed by a representation of the product rights layer (e.g., 8 bits). In some embodiments, the token ID includes a representation of the reference layer (e.g., 120 bits), immediately followed by a representation of the product layer (e.g., 128 bits). In other embodiments, the token ID includes a representation of the product layer (e.g., 128 bits), immediately followed by a representation of the product rights layer (e.g., 8 bits). In still other embodiments, the token ID includes a representation of the reference layer (e.g., 120 bits), followed (whether immediately or not) by a representation of the product rights layer (e.g., 8 bits).

In other embodiments, the token ID can include a modified ordering of the reference layer, product layer, and product rights layer. For example, the token ID can include a representation of the product layer (e.g., 128 bits), immediately followed by a representation of the reference layer (e.g., 120 bits), immediately followed by a representation of the product rights layer (e.g., 8 bits). Alternatively, the token ID can include the following modified ordering: a representation of the product rights layer (e.g., 8 bits), immediately followed by a representation of the product layer (e.g., 128 bits), immediately followed by a representation of the reference layer (e.g., 120 bits). Alternatively, the token ID can include the following modified ordering: a representation of the reference layer (e.g., 120 bits), immediately followed by a representation of the product rights layer (e.g., 8 bits), immediately followed by a representation of the product layer (e.g., 128 bits). Alternatively, the token ID can include the following modified ordering: a representation of the product rights layer (e.g., 8 bits), immediately followed by a representation of the reference layer (e.g., 120 bits), immediately followed by a representation of the product layer (e.g., 128 bits). Alternatively, the token ID can include the following modified ordering: a representation of the product layer (e.g., 128 bits), immediately followed by a representation of the product rights layer (e.g., 8 bits), immediately followed by a representation of the reference layer (e.g., 120 bits).

As used herein, "non-fungible assets" are assets having one or more unique properties (e.g., serial numbers) such that that unique instances, or individual specimens, of those assets can be individually specified or referred to. Unlike fungible assets such as currency, which can be freely exchanged with "equivalent" values of the same currency and/or with different currencies, non-fungible assets may be valued based on their unique properties. Non-fungible assets can be tangible, physical assets such as consumer goods, products, vehicles, property, etc.

Due to the hierarchical nature of the tokens set forth herein, transactions involving an asset token can be accomplished (e.g., using a smart contract) individually at each of the different layers of hierarchy, or at a subset of the layers of hierarchy (e.g., at one or two layers), thereby increasing processing efficiency, reducing latency, reducing processing resources consumed, reducing "gas" (e.g., the fractions of an Ethereum token used to pay miners securing a transaction), and/or saving processing costs. For example, a transaction of an asset token as set forth herein can include a modification to at least one layer from a plurality of layers of the asset token such that a processing efficiency of the transaction is increased relative to a transaction of a non-hierarchical token. In some implementations, a reference token is associated with (e.g., by specifying an address of) a smart contract that can be used to enforce rules with regard to the use of all asset tokens created under this reference token.

As used herein, a "smart contract" refers to a self-executing contract that is implemented in code and that includes terms of an agreement between two parties (e.g., a buyer and a seller) written directly into the lines of code. A smart contract can digitally facilitate, verify, or enforce the negotiation or performance of the contract. Smart contracts can allow the performance of credible transactions without the participation of the contracting parties and without the participation of third parties. A smart contract can be stored, executed and/or transacted on a distributed ledger such as a blockchain. Smart contract transactions are trackable and irreversible.

As used herein, a "transaction" can refer to a sale of an asset token, a sale of a non-fungible asset, a partial sale of an asset token, a partial sale of a non-fungible asset, a change in ownership of an asset token, a change in ownership of a non-fungible asset, a disassembly of the non-fungible asset, an assembly of the non-fungible asset, a generation of an asset token, an initial production of a non-fungible asset, a decommissioning or destruction of an asset token, a decommissioning or destruction of a non-fungible asset, a movement or change of storage location of a non-fungible asset, a transport of a non-fungible asset, a modification of an asset token, and/or a modification of a non-fungible asset.

Embodiments of the present disclosure can facilitate the tokenization (and, thus, representation) of a complex or composite asset on the blockchain or any other distributed ledger (e.g., based on a consensus algorithm), without the use of off-chain storage of hierarchical data associated with the complex or composite asset. As such, using methods of the present disclosure, components, sub-components, or the entirety of a tokenized asset can be continuously traced and efficiently transferred between owners. In addition, rules (e.g., manufacturing rules, business rules, etc.) can be efficiently applied/enforced on a large number of individual assets that, for example, have a common asset type.

In some embodiments, three different types of tokens (e.g., product reference tokens, product tokens, and product rights tokens, discussed further below) can be mapped onto a single asset (e.g., via a single asset token). By representing multiple classes of assets within the same smart contract and facilitating ready/immediate identification of a given asset's class, transaction costs can be reduced.

In some embodiments, a system for the fully-on-chain (i.e., fully on the blockchain) representation of complex assets is based on, and leverages, the Ethereum ERC-721 standard, but adds one or more of the following features:

Implementation of a Specific Token Structure for the Tokenization of Assets

Within an ERC-721 smart contract, tokens can be identified by or associated with a "tokenId" (also referred to herein as a "token ID") encoded using 256 bits. TokenIds can be mapped to an Ethereum address that associated with the token owner. For traceability applications, asset tokens can serve as digital twins of business assets, and can be transferred to participants of a business process, such that the assets, as well as the rights (e.g., ownership rights) and obligations of the participants with regard to those assets, can be traced (e.g., in response to, or in parallel with, a real world transaction of those assets). Applying business rules to the assets underlying (i.e., represented by) the asset tokens in such contexts, however, can be challenging to implement since business rules typically apply differently to different assets, for example depending on the type, structure, class or other feature of that asset. Known approaches have included defining business rules separately for each unique tokenId, deploying a different ERC-721 smart-contract for each class of asset, or using metadata associated with each tokenId, Such known approaches can be undesirably processor resource-intensive (particularly when operating on the blockchain), as many intermediate transactions may be needed to obtain the full "picture" of an asset.

Figure 1:
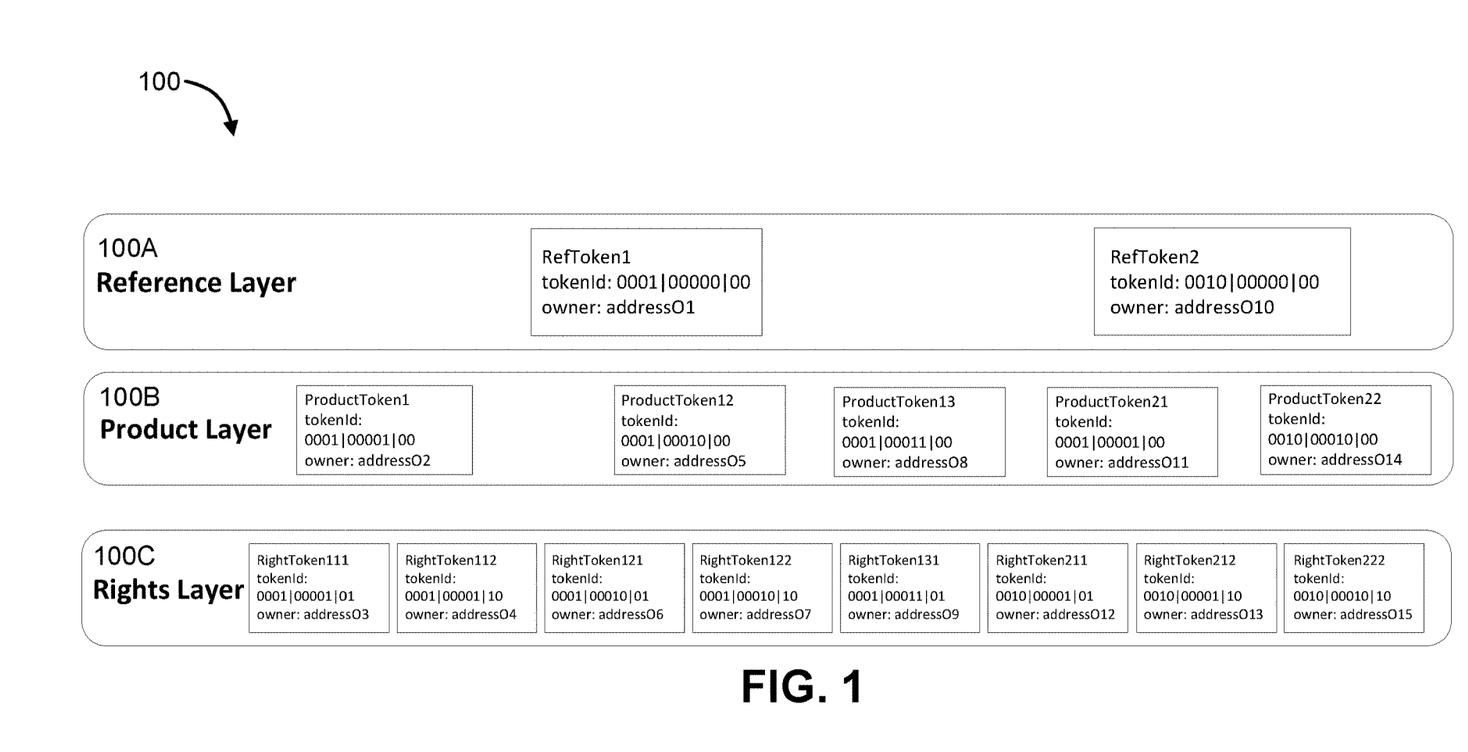
FIG. 1 shows a structure of an asset token, according to some embodiments.
Figure 2:
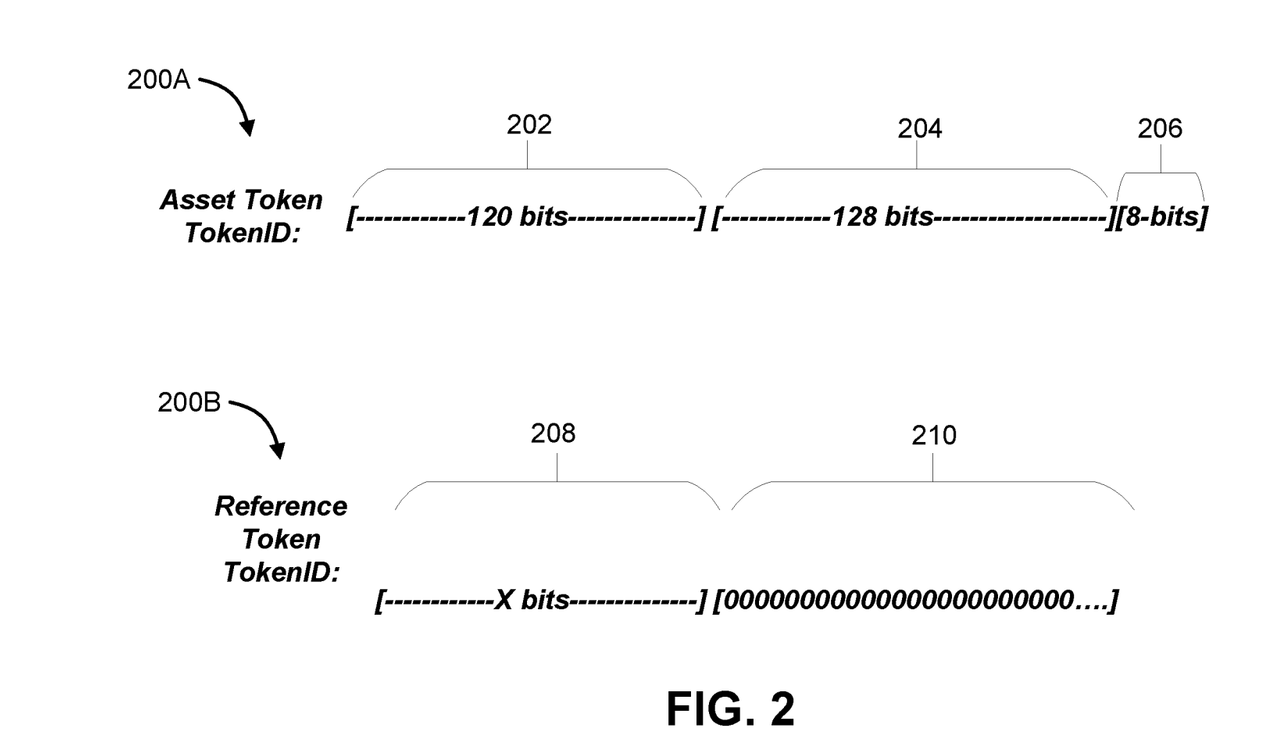
FIG. 2 shows the structure of an asset token identifier and a reference token identifier, according to some embodiments.

According to methods set forth herein, in some embodiments, a three-layer representation of a non-fungible business asset (i.e., the three-layer hierarchical information discussed above) is generated for an asset token (e.g., asset token 100, as shown in FIG. 1), such that a specific encoding of the tokenId (shown at 200A in FIG. 2), to include the following three representations, is enforced/applied:

(1) A reference layer (or "sub-token"), encoded on a first sub-part or portion of the tokenId (for example on the first 120 bits—see 100A in FIGS. 1 and 202 in FIG. 2). The reference layer identifies the overall nature of the asset (e.g., a vehicle, such as a car). In some implementations, business rules can be applied to an asset based solely on the nature of that asset (and, hence, based solely on the reference layer portion of the tokenId). As shown in FIG. 1, the reference layer 100A can be associated with multiple reference sub-tokens each including a unique reference sub-token identifier and an associated owner address. The reference layer can correspond to the product reference token 560 in FIG. 5, discussed below.

(2) A product layer (or "sub-token"), encoded on a second sub-part or portion of the tokenId (for example, on the next 128 bits following the bits associated with the reference layer—see 204 in FIG. 2). The product layer in combination with the reference layer (i.e., the product layer portion of the tokenId in combination with the reference layer portion of the tokenId) can be used to identify each unique asset. In other words, the product layer in combination with the reference layer can be viewed as the "digital twin" of the real-world asset, in that the product layer in combination with the reference layer uniquely identifies a specific real-world asset. In some implementations, the product layer is used for tracing/traceability of the represented asset. In some embodiments, a subset of the second sub-part of the tokenId (e.g., the last 8 bits) are zeros, such that the product sub-token can be readily identified as being a product token, rather than a rights and obligations token. As shown in FIG. 1, the product layer 100B can be associated with multiple product sub-tokens each including a unique product sub-token identifier and an associated owner address. The product layer can correspond to the product token 562 in FIG. 5, discussed below.

(3) A rights and obligations layer (or "sub-token"), encoded on a third sub-part or portion of the tokenId (for example, on the last 8 bits of a 256-bit tokenId, following the bits associated with the reference layer and the product layer—see 206 in FIG. 2). The rights and obligations layer can be used to identify the rights and/or obligations associated with an asset that is owned by, or that can potentially be owned by, one or more owners. In some cases, the legal ownership and the physical custody of a given asset can be attributed to different owners/participants/individuals via the rights and obligations layer. As shown in FIG. 1, the rights layer 100C can be associated with multiple rights sub-tokens each including a unique rights sub-token identifier and an associated owner address. As also shown in FIG. 1, the owner addresses (and, hence, the owners) referenced by each of the reference layer 100A, the product layer 100B, and the rights layer 100C can differ from one another. The rights and obligations layer can correspond to the product rights token 564 in FIG. 5, discussed below.

Encoding the three layers (reference layer, product layer, and rights and obligations layer) within the tokenId for the same smart-contract facilitates the direct identification, via inspection of the tokenId itself (e.g., autonomously via the smart contract when configured to inspect the tokenId and/or by a user viewing the tokenId via a graphical user interface (GUI) display of a mobile software application (e.g., a mobile/virtual wallet) running on a mobile compute device of the user), of the nature of the asset, the specific instance of the asset (i.e., the unique asset), and the rights and/or obligations (if any) associated with the asset underlying the asset token.

In some embodiments, a reference token is also created/generated/defined, the reference token having an associated tokenId with a non-zero value (e.g., a number or other type of character string) on a first sub-part of the tokenId, and 0s on all other bits. An example reference token tokenID 200B is shown in FIG. 2, with a value represented by the first X bits (208) and followed by a string of zeros (210). The tokenId of the reference token can represent the address of a smart-contract associated with, or acting as, an owner of one or more assets. The smart-contract can, in turn, function as a controller or enforcer to enforce specific rules to all tokens created using the reference token. The tokenId can be readily identified as a reference token tokenId by the trailing zeros that it includes.

Ownership of an Asset Token by Another Asset Token Within the Same Smart Contract.

In some embodiments, complex assets are fully represented by one or more associated asset tokens and/or sub-component asset tokens associated with (e.g., referenced and/or transacted by) a common smart contract, and are therefore traceable as a whole as well as based on each of the sub-components thereof. Using the tokenId structures set forth herein, asset tokens for the sub-components of a given asset can be directly associated with, and can be viewed as being "owned by," the asset token for the asset as a whole. As such, transfers of asset tokens representing complex (i.e., multi-part) assets can be accomplished with a similar amount of processing resources as would be used for the transfer of a single asset token associated with a single-part asset having no sub-components. Alternatively or in addition, rules governing asset token transactions can be implemented based on the hierarchical asset data. As an example, a rule can be implemented that prevents the definition or modification of an asset token to include an incompatible sub-component asset token (e.g., a motorcycle engine cannot be installed in a car).

Implementation of Batch Transfer Functions for the Efficient Transfer of Multiple Asset Tokens In some embodiments, a transfer or other transaction of an asset token associated with a complex/multi-part asset can be accomplished in a single step, with the concurrent transfer (or other transaction) of one or more sub-component asset tokens (i.e., a "batch transfer"). As such, operations on multiple tokens via the same (e.g., a single) blockchain transaction can be performed. Batch transfers of multiple asset tokens within a single transaction can provide improved scalability and consistency of transaction processing, and/or reduced costs. In some implementations, a rule is defined that prevents the partial transacting (i.e., of a subset of the associated sub-component asset tokens) of a given asset token.

Figure 3:
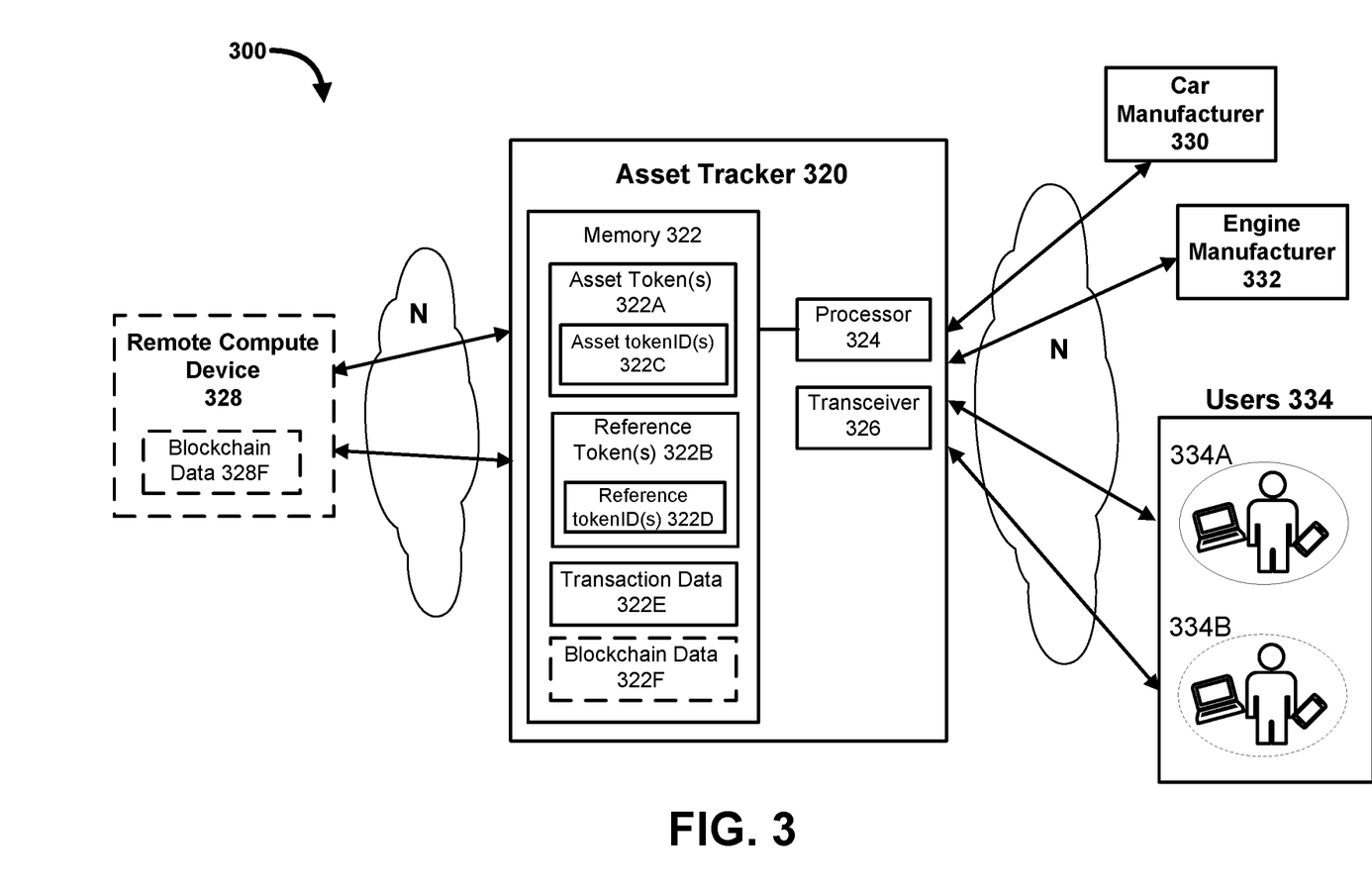
FIG. 3 is a diagram of a system for performing full on-chain blockchain representation of complex assets, according to some embodiments.

FIG. 3 is a diagram of a system for performing full on-chain blockchain representation of complex assets, according to some embodiments. As shown in FIG. 3, the system 300 includes an asset tracker 320 including a memory 322 operably coupled to a processor 324, and a transceiver 326 operably coupled to the processor 324 and/or the memory 322 and configured for wired and/or wireless communication with remote compute devices, for example via a telecommunications network N. The processor 324 can include, for example, a general-purpose processor, a field programmable gate array (FPGA), and/or an application specific integrated circuit (ASIC). The memory 322 stores asset tokens 322A, reference tokens 322B, asset tokenIDs 322C, reference tokenIDs 322D, transaction data 322E (for example, for transactions of asset tokens 322A), and optionally, blockchain data 322F (e.g., smart contract data, owner addresses, cryptographic hashes, timestamps, records ("blocks"), etc.). The memory 322 can also store software (executable on hardware), for example to generate and/or transact the asset tokens 322A, reference tokens 322B, asset tokenIDs 322C, and reference tokenIDs 322D, that can be expressed in a variety of software languages (e.g., computer code), including C, C++, Java™, Ruby, Visual Basic™, and/or other object-oriented, procedural, or other programming language and development tools. The asset tracker 320 can be in communication with at least one remote compute device 328, e.g., via wireless communication over the network N. The at least one remote compute device 328 can include blockchain data 328F, for example acting as part of a peer-to-peer blockchain network. The asset tracker 320 can also be in communication with at least one entity (e.g., a car manufacturer 330 and an engine manufacturer 332) and one or more users 334A, 334B, e.g., via wireless communication over the network N. For example, the asset tracker 320 can receive asset data for a car from a compute device of a car manufacturer 330, asset data for an engine from a compute device of an engine manufacturer 332, and ownership data from a compute device of remote user 334A. The asset and ownership data can be used by the asset tracker to generate a single asset token 322A with an associated tokenID 322C, the asset token 322A thus representing the composite asset of the car and its ownership details.

Figure 4:
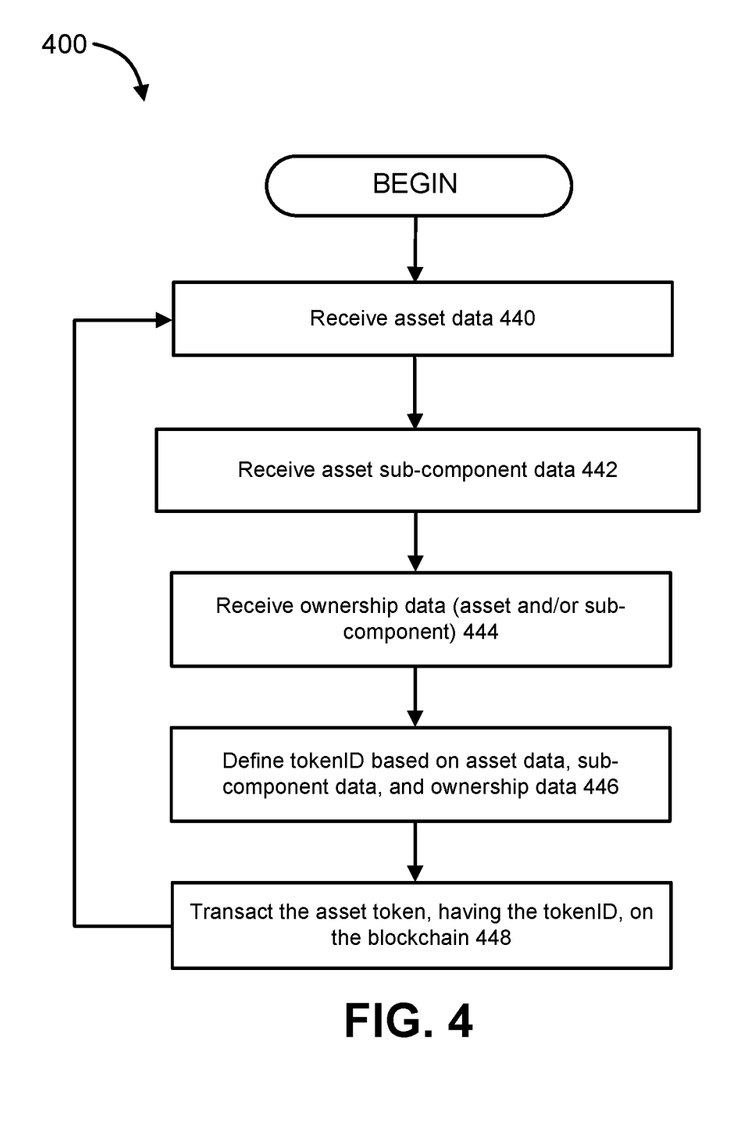
FIG. 4 is a flow diagram illustrating a method of defining and transacting an asset token, according to some embodiments.

FIG. 4 is a flow diagram illustrating a method of defining and transacting an asset token, according to some embodiments. As shown in FIG. 4, the method 400 includes receiving (e.g., at an asset tracker, such as asset tracker 320 of FIG. 3) asset data at 440, asset sub-component data at 442, and ownership data for the asset and/or the sub-component at 444. A three-layer token ID (also referred to herein as a hierarchical token identifier) can be generated (or defined), at 446, based on the received asset data, the received sub-component asset data, and the received ownership data (e.g., via a reference layer, a product layer, and a rights and obligations layer, as discussed above). Once the token ID has been generated, an asset token associated with the token ID (optionally generated in parallel with the generation of the token ID) can be transacted, at 448, on a distributed ledger (e.g., a blockchain). The transaction can be carried out in accordance with, and based on, rules defined by a smart contract. Transactions of the asset token can be authenticated prior to being recorded on the blockchain. For example, the method 400 can further include attempting to authenticate a transaction of the asset token in response to a real-world transaction associated with the non-fungible asset. The to-be-performed transaction of the asset token can include a modification to at least one layer from the plurality of layers of the asset token. If the attempt to authenticate the transaction fails, and in response to failing to authenticate the transaction, a signal representing the failure to authenticate the transaction can be sent (e.g., to a compute device of a user, who may be a party to the transaction). Alternatively or in addition, if the attempt to authenticate the transaction fails, and in response to failing to authenticate the transaction, the transaction may not be recorded on the distributed ledger (e.g., the recording of the transaction on the distributed ledger may be prevented or blocked).

Figure 5:
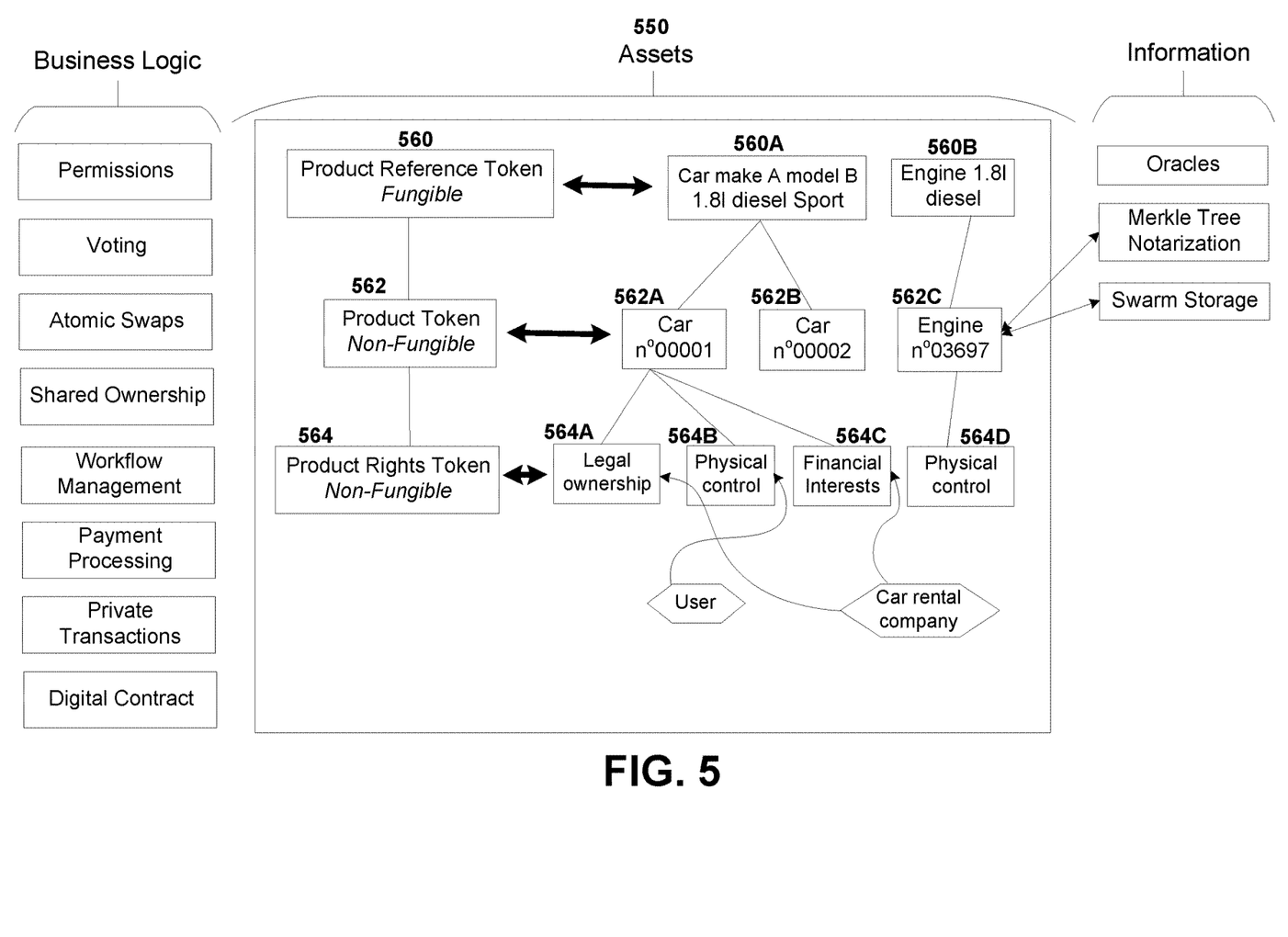
FIG. 5 is a diagram showing component relationships for an implementation of a system for full on-chain blockchain representation of complex assets, according to some embodiments.

FIG. 5 is a diagram showing component relationships for an implementation of a system for full on-chain blockchain representation of complex assets, according to some embodiments. As shown in FIG. 5, each asset from a collection of assets can be represented by three token types: a product reference token 560 (i.e., a reference layer of a multilayered composite token), a non-fungible product token 562, and a non-fungible product rights token 564. The product rights token 564, when defined, can inherit data from the product reference token 560 and/or the non-fungible product token 562 and/or is immutably linked to the product reference token 560 and/or the non-fungible product token 562. For example, the product rights token 564 can inherit the referenceID and the productID. As an example, shown in the right-hand portion of the assets 550 box in FIG. 5, a product reference token 560A can be generated for a car, having a make "A" and a model "B," and the product reference token 560A can be associated with (e.g., via a shared token ID, or token identifier, as discussed above) a product token 562A for the specific car no. 00001 and a product token 562B for the specific car no. 00002. The product token 562A for the specific car no. 00001 can be associated with (e.g., via a shared token ID, as discussed above) product rights token 564A defining the legal ownership of car no. 00001, product rights token 564B defining the current physical control/possession of car no. 00001, and product rights token 564C defining financial interests attached to car no. 00001.

Similarly, a product reference token 560B can be generated for a 1.8 Liter diesel engine, and the product reference token 560B can be associated with (e.g., via a shared token ID, as discussed above) a product token 562C for the specific Engine no. 03697. The product token 562C for the specific Engine no. 03697 can, in turn, be associated with (e.g., via a shared token ID, as discussed above) product rights token 564D, defining the physical control of Engine no. 03697. Each of 560A-B, 562A-C and 564A-D can be combined in a single asset token, and transacted (e.g., transferred) collectively/together via a single blockchain transaction. In some implementations, the product reference token has an associated identifier (a "UID") that remains the same, regardless of changes below in the hierarchy (e.g., at the product token and/or product rights token). The first 248 bits (or any other number of bits) of the identifiers associated with the product tokens 562A-562C and/or the product rights tokens 564A-564D can match the UID. For example, the first 248 bits of the product rights token 564 can match the UID, and data associated with/representing the rights follows those 248 bits. For example, the data associated with and/or representing the rights can be represented via 8 bits. These 8 bits can represent a type of ownership right (e.g., legal ownership, physical control, etc.). In some such implementations, the 8 bits of data associated with/representing the rights represent only a type of ownership right. The total information stored for the token ID can appear, for example, as follows, the token ID associated with an address of the owner of the ownership right (the ownership right encoded, for example, via 160 bits):

Token ID: refID(120 bits)|productId(128 bits)|rightTypeID(8 bits)

In some embodiments, once the product token 562A for car no. 00001 and the legal ownership token 564A for car no. 00001 have been generated, and in response to the generation of the product token 562A and the legal ownership token 564A, the physical control token 564B can be destroyed. In other words, once the manufacturer transfers ownership after purchase by a customer, the physical control token 564B for the manufacturer can be destroyed and a new physical control token for the customer can be created.

In some embodiments, in response to a detected attempt to create/generate a new asset token (e.g., detected based on a user input), a permissions check is triggered, and/or one or more rules (e.g., business rules) can be enforced (e.g., via the appropriate smart contract(s)). In some embodiments, on-chain asset management and tracking is performed by the smart contract.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the scope of the disclosure.

The invention claimed is:

1. A method, comprising:
generating an asset token for a non-fungible asset, the asset token including a hierarchical identifier referencing a plurality of layers including a reference layer, a product layer, and a product rights layer, the asset token having an associated token identifier that includes, sequentially, a representation of the reference layer, a representation of the product layer, and a representation of the product rights layer, the product rights layer including a representation of one of a right associated with the non-fungible asset or an obligation associated with the non-fungible asset; and
authenticating a transaction of the asset token on a distributed ledger in response to a real-world transaction associated with the non-fungible asset, the transaction of the asset token including a modification to at least one layer from the plurality of layers, a processing efficiency of the transaction being increased relative to a transaction of a non-hierarchical token.

2. The method of claim 1, wherein the reference layer includes a representation of a type of the non-fungible asset.

3. The method of claim 1, wherein the product layer includes a unique representation of the non-fungible asset.

4. The method of claim 1, wherein the product rights layer includes the representation of the right associated with the non-fungible asset.

5. The method of claim 1, further comprising transacting the asset token at each of the reference layer, the product layer, and the product rights layer.

6. The method of claim 1, further comprising transacting the asset token at one of the reference layer, the product layer, or the product rights layer.

7. The method of claim 1, further comprising generating a reference token specifying a distributed ledger address of a smart contract to enforce a rule associated with the asset token.

8. A system, comprising:
a processor; and
a memory storing processor-executable instructions to cause the processor to:
generate an asset token for a non-fungible asset, the asset token including a hierarchical identifier referencing a reference layer, a product layer, and a product rights layer, the product rights layer including a representation of one of a right associated with the non-fungible asset or an obligation associated with the non-fungible asset;
attempt to authenticate a transaction of the asset token in response to a real-world transaction associated with the non-fungible asset, the transaction of the asset token including a modification to at least one layer from the plurality of layers; and
in response to failing to authenticate the transaction, sending a signal representing the failure to authenticate the transaction.

9. The system of claim 8, wherein the non-fungible asset is an asset including multiple sub-components.

10. The system of claim 8, wherein the memory further stores instructions to cause the processor to define a token identifier for the asset token.

11. The system of claim 8, wherein the memory further stores instructions to cause the processor to define a token identifier for the asset token, the token identifier encoding: (1) the reference layer in a first portion of the token identifier, (2) the product layer in a second portion of the token identifier following the first portion, and (3) the product rights layer in a third portion of the token identifier following the second portion.

12. The system of claim 8, wherein the non-fungible asset is a tangible, multi-component asset.

13. The system of claim 8, wherein the reference layer includes a representation of a type of the non-fungible asset.

14. The system of claim 8, wherein the product layer includes a unique representation of the non-fungible asset.

15. A method, comprising:
   receiving asset data associated with a non-fungible asset;
   receiving asset subcomponent data associated with the non-fungible asset;
   receiving ownership data associated with a non-fungible asset;
   defining a hierarchical token identifier for an asset token, based on the asset data, the asset subcomponent data, and the ownership data, the asset token including hierarchical information having a representation of one of a right or an obligation associated with the non-fungible asset;
   attempting to authenticate a transaction of the asset token on a distributed ledger, the transaction referencing the token identifier, the transaction of the asset token including a modification to at least one layer from a plurality of layers of the asset token; and
   in response to failing to authenticate the transaction, not recording the transaction on the distributed ledger.

16. The method of claim 15, wherein the transaction of the asset token is performed using a smart contract.

17. The method of claim 15, wherein the non-fungible asset is a tangible, multi-component asset.

18. The method of claim 15, further comprising generating the asset token, the asset token including the hierarchical identifier, the hierarchical identifier referencing a reference layer including the asset data, a product layer including the asset subcomponent data, and the product rights layer including the ownership data.

19. The method of claim 15, wherein the hierarchical information further includes a representation of a type of the non-fungible asset and a unique representation of the non-fungible asset.

20. The method of claim 15, further comprising:
   tracking a modification to the non-fungible asset using the token identifier; and
   transmitting a signal representing the modification to a compute device for presentation to a user.

* * * * *